T. M. PLATT.
REAMER.
APPLICATION FILED JUNE 6, 1912.
1,053,531. Patented Feb. 18, 1913.
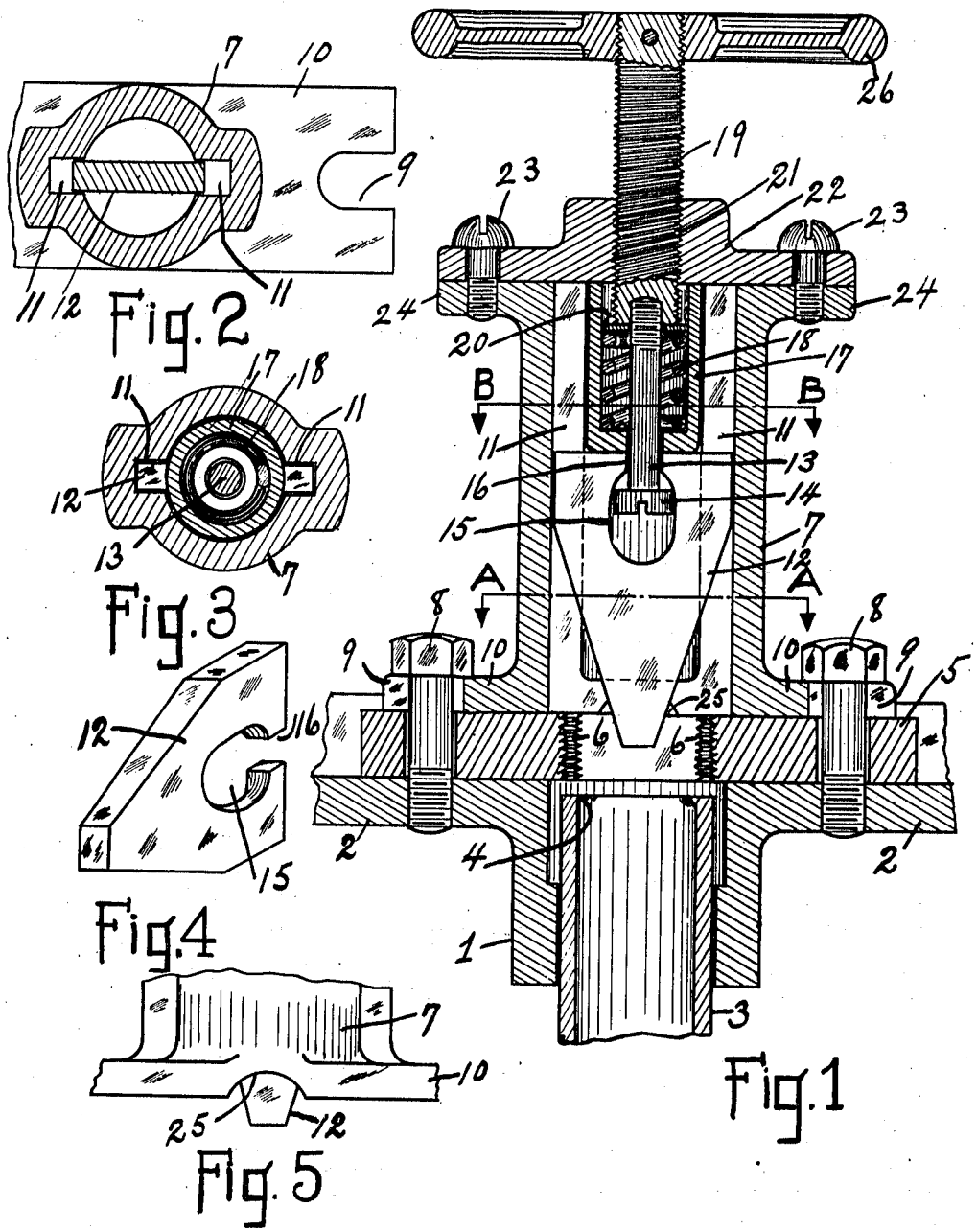

UNITED STATES PATENT OFFICE.

THOMAS M. PLATT, OF PHILADELPHIA, PENNSYLVANIA.

REAMER.

1,053,531.  Specification of Letters Patent.  Patented Feb. 18, 1913.

Application filed June 6, 1912. Serial No. 701,998.

*To all whom it may concern:*

Be it known that I, THOMAS M. PLATT, a citizen of the United States, residing in the city of Philadelphia, county of Philadelphia, and State of Pennsylvania, have invented certain new and useful Improvements in Reamers, of which the following is a specification.

My invention relates to reamers, and more particularly to reamers for pipes and the like.

My invention resides in apparatus for operating and controlling a reamer, and more particularly when used in conjunction with a die and stock, which is actuated either manually or by power machinery.

It is the object of my invention to provide means for reaming the bur or other projections or protuberances on the inner wall of a hollow body such as a pipe, together with means for driving the reamer and causing it to be thrust against the work with a given or desired tension or pressure.

My invention resides in the apparatus hereinafter described and claimed.

For an illustration of one of the forms my invention may take reference is to be had to the accompanying drawing, in which:

Figure 1 is a longitudinal sectional view, some parts in elevation, of apparatus embodying my invention. Fig. 2 is a sectional view on the line A—A, Fig. 1, showing some parts in plan. Fig. 3 is a sectional view on the line B—B, Fig. 1. Fig. 4 is a perspective view of the reamer proper or cutter. Fig. 5 is a fragmentary view showing an aperture in the reamer body through which the thread cutting may be viewed.

Referring to the drawing, 1 represents the throat member of pipe threading apparatus, such member having the lateral extensions 2 which may carry handles for manual operation, or the member 1 may be suitably driven by power machinery. A pipe 3 is shown extending into the throat 1 and as having the bur 4 on its inner side at one end, which bur is to be removed by the reamer. Secured to the parts 1 and 2 is the thread cutting die member 5 showing the thread cutters at 6. Upon the threading member 5 or 2 is secured the reamer body 7 by the bolts 8 which extend through the slots 9 in the flange 10 of the reamer body, these bolts extending also through the die block 5 into the members 2, the bolts 8 thus holding the three members securely together. The reamer body 7 is hollow, and has the longitudinally extending slots 11 communicating with the main opening in the member 7. The cutter or reamer proper is shown at 12 as a flat member of tool steel tapering toward the die block 5. The cutter 12 is of a thickness to pass freely in the slots 11 longitudinally of the member 7. A member 13, such as a screw has a head 14 disposed in the longitudinally extending slot or opening 15 in the cutter 12, the shank 13 of the screw extending through the narrowed aperture 16 and through the bottom of the cylindrical member 17 within which is confined the spring 18. The member 13 is threaded into the member 19 between which and the spring 18 may intervene the plate 20. The screw threads on the member 19 engage in the screw threaded aperture 21 in the cap 22 secured by screws 23 to the top flange 24 of the reamer body 7. At one end of the reamer body 7 are provided on opposite sides apertures 25 through which the thread cutting may be viewed.

The operation is as follows: The pipe 3 is held in a suitable vise or clamp and the throat member 1 extended over the end of the pipe in the position shown in Fig. 1 and the die brought to the end of the pipe while the members 2 are rotated with respect to the pipe either manually or by power. The screw threading occurs in the usual manner by this rotating of the die with respect to the pipe. And the cutter 12 is advanced into the end of the pipe and its sharpened edges engage the bur 4 and cut the same away as the die advances upon the pipe 3. The cutter is rotated with the die, the engagement of the sides of the cutter in the slots 11 forcing it to rotate with the die. The spring 18 is shown under compression, its upper end being stationary for any given adjustment of the member 19, which may be adjusted to different positions by turning the attached hand wheel 26, and the lower end of the spring thrusts against the bottom of the member 17 which in turn thrusts against the top of the cutter 12, causing the cutter 12 to be thrust against the bur 4 with the desired pressure determined by the amount of compression given to the spring 18. As the hand wheel 26 is rotated to give the spring 18 different adjustments of compression, the screw 13 advances with the stem 19 and the head 14 moves longitudinally within the opening or slot 15 in the cutter. Upon removal of the screws 23 and the cap 22 the removal of the cap 22 carries with it the stem 19 and the screw 13 which will lift out the cutter 12 from within the reamer body 7.

From the foregoing description it is apparent that as the threads are cut upon the pipe the cutter 12 reams the pipe, and that the pressure of application of the cutter may be adjusted at will, and for any adjustment remains constant until the adjustment is changed.

What I claim is:

1. As an article of manufacture, a flat cutter having an aperture adapted to receive a head, and having a narrowed slot extending from said aperture through to an edge of said cutter.

2. As an article of manufacture, a flat cutter having cutting edges tapering toward each other and having an aperture adapted to receive a head and having a narrowed slot extending from said aperture to an edge of said cutter.

3. The combination with a body having a longitudinal slot, of a cutter rotatable with said body and movable longitudinally in said slot, a spring exerting pressure on said cutter, means for adjusting said spring, and means for loosely supporting said cutter upon said adjusting means.

4. The combination with a body having a bore and having a longitudinal slot communicating with said bore, a cutter within said body extending across said bore and into said slot and movable longitudinally in said slot, a spring exerting pressure on said cutter, means for adjusting said spring, and means loosely supporting said cutter upon said adjusting means.

5. The combination with a body, of a cutter within the same and movable longitudinally thereof, a spring, spring adjusting means movable with respect to said body, means inclosing said spring and thrust by said spring against said cutter, and means loosely supporting said cutter upon said spring adjusting means.

6. The combination with a body having a bore, of a cutter movable longitudinally of said body within the same, a casing within said bore, a spring within said casing exerting pressure on said cutter, means for adjusting said spring, and means loosely supporting said cutter upon said adjusting means.

7. The combination with a body having a bore and having slots communicating with said bore, a cutter extending across said bore and into said slots and movable longitudinally of said body in said slots, a spring exerting pressure on said cutter, spring adjusting means, a member secured to said spring adjusting means, and a head on said member, said cutter having an elongated opening receiving said head.

8. The combination with a body having a bore and having slots communicating with said bore, of a cutter extending across said bore and into said slots and movable longitudinally in said slots, a cap on said body, a member threaded through said cap, a spring for exerting pressure on said cutter intervening between said member and said cutter, said cutter having an aperture and having a narrowed slot extending from said aperture through to a face of said cutter, and a member attached to said first named member and having a head and shank disposed respectively in said aperture and said slot in said cutter.

9. The combination with a body, of a cutter movable longitudinally in said body and rotatable with said body, a member adjustable longitudinally of said body, a spring for exerting pressure on said cutter intervening between said member and said cutter, said cutter having an aperture and having a narrowed slot extending from said aperture through to one face of said cutter, and a second member attached to said first named member and having a head and shank disposed respectively in said aperture and in said narrowed slot of said cutter.

In testimony whereof I have hereunto affixed my signature in the presence of the two subscribing witnesses.

THOMAS M. PLATT.

Witnesses:
EDWARD CARTLEDGE,
MABEL W. YERKES.